US007993757B2

(12) United States Patent
Günzel et al.

(10) Patent No.: US 7,993,757 B2
(45) Date of Patent: Aug. 9, 2011

(54) LAYER SUPPORT FOR RECORDING MATERIALS

(75) Inventors: Gisela Günzel, Ostercappeln (DE); Kerstin Hackmann, Osnabrück (DE); Dietmar Bunke, Georgsmarienhütte (DE); Jörg Bömermann, Hüde (DE); Mirko Standke, Bohmte (DE)

(73) Assignee: Felix Schoeller Jr. Foto-und Spezialpapiere GmbH & Co. KG, Osnabruck (DE)

(*) Notice: Subject to any disclaimer, the term of this patent is extended or adjusted under 35 U.S.C. 154(b) by 248 days.

(21) Appl. No.: 12/224,964

(22) PCT Filed: Mar. 22, 2007

(86) PCT No.: PCT/EP2007/052754

§ 371 (c)(1), (2), (4) Date: Jan. 21, 2009

(87) PCT Pub. No.: WO2007/110367

PCT Pub. Date: Oct. 4, 2007

(65) Prior Publication Data

US 2009/0311515 A1 Dec. 17, 2009

(30) Foreign Application Priority Data

Mar. 24, 2006 (DE) ......................... 10 2006 014 183

(51) Int. Cl.
*B32B 5/66* (2006.01)

(52) U.S. Cl. ...................... 428/537.5; 428/608; 428/847

(58) Field of Classification Search ............... 428/537.5, 428/846, 608, 847
See application file for complete search history.

(56) References Cited

U.S. PATENT DOCUMENTS 5,332,474 A * 7/1994 Maxham ...................... 162/189

FOREIGN PATENT DOCUMENTS

| | | | |
|---|---|---|---|
| EP | 1 126 081 A2 | | 8/2001 |
| EP | 1 146 390 A2 | | 10/2001 |
| EP | 1146390 A2 | * | 10/2001 |
| WO | WO 97/26140 A | | 7/1997 |

OTHER PUBLICATIONS

The International Search Report for PCT Application No. PCT/EP2007/052754.

* cited by examiner

*Primary Examiner* — Leszek Kiliman
(74) *Attorney, Agent, or Firm* — Amster, Rothstein & Ebenstein LLP

(57) ABSTRACT

A support material for recording layers comprising a raw base paper contains a hardwood pulp having a fiber fraction smaller than 200 μm, after refining, of at most 45 wt. % and an average fiber length of 0.4 to 0.8 mm and a filler fraction of 5 to 40 wt. %, in particular 10 to 25 wt. %, relative to the mass of the pulp.

25 Claims, No Drawings

LAYER SUPPORT FOR RECORDING MATERIALS

This is a U.S. national phase of PCT Application No. PCT/EP2007/052754, filed Mar. 22, 2007, and claims priority to German Application No. 10 2006 014 183.0, filed Mar. 24, 2006.

The invention relates to a support material for recording materials as well as its use as photographic support materials and as support materials for digital recordings such as ink jet recording methods, thermal dye diffusion transfer methods and colour laser methods.

Resin-coated base papers (support materials) are used for producing photographic recording materials, which must satisfy stringent requirements with regard to the surface quality and photochemical safety.

These resin-coated base papers usually consist of a sized raw base paper which is preferably coated on both sides with polyolefin by means of extrusion. During the extrusion coating of paper, crater-shaped defects, so-called pits, are formed on the polymer surface depending on the coating speed. At high rotational speeds of the cooling cylinder, the air bubbles enclosed in fine recesses on the surface of the cooling cylinder cannot escape before contact with the hot resin so that the included air only escapes after the coating of the paper with the formation of crater-shaped recesses on the polymer surface. These surface defects have a negative influence on the surface properties required on the support material and decisive for the image quality such as gloss and smoothness. The surface can be improved by increasing the quantity of coated resin but this measure is not sufficient at high extrusion speeds and additionally entails higher material costs. However, not only pits but also raw paper properties such as surface roughness/smoothness and the paper formation (fibre distribution) are decisive for the surface impression.

EP 0 952 483 B1 describes a photographic support and proposes applying a kaolin-containing coating to the raw base paper, where the quantity of kaolin must not exceed 3.3 g/m$^2$. In addition, the requirement is imposed that the top side of the pigment coating has an average roughness Ra of 1.0 μm or less. Presumably, adhesion problems in regard to the polyolefin layer to be applied to the pigment coating arise if the value falls below this.

A uniform surface of support material is not only important for photographic-recording materials. To obtain a photo-like appearance, polyolefin-coated papers are used in the manufacture of non-photographic recordings materials, for example, ink jet papers. A non-uniform or defective support surface reduces the quality of the recording image.

The paper surface can be improved by adding inorganic fillers to the pulp suspensions since the cavities inside the fibre mat are filled by filler particles which improves the paper smoothness and enhances the opacity. At the same time, however, the incorporation of fillers into the paper mass reduces the strength and the stiffness of the paper. These deteriorations in the properties limit the use of fillers. Restrictions are also imposed on the choice of filler since the type of filler can influence the photographic material or have undesirable effects during the development process. For example, calcium carbonate tends to wash out and precipitate in the form of calcium salts in the development liquid.

In EP 1 146 390 A1 the retention of the filler is improved by compacting the paper to a density of 1.05 to 1.20 g/cm$^3$.

JP 2004-149952 uses a filled paper provided with a latex-containing pigment coating as support material. The latex used in the coating is a water-dispersible acrylic latex.

It is the object of the invention to provide a support material for recording materials whose surface has a sufficiently high smoothness so that after recording, the image quality is not adversely influenced by negative surface properties of the support. In particular, not only a good surface but also sufficient stiffness and strength should be achieved whilst saving material. Finally, it is desirable to produce the raw base paper in such a manner that production waste can easily be recycled in the headbox of the paper machine without expensive preparation of the production waste being required beforehand.

This object is achieved by a support material for recording layers comprising a raw base paper containing a hardwood pulp having a fibre fraction smaller than 200 μm, after refining, of at most 45 wt. % and an average fibre length of 0.4 to 0.8 mm and a filler fraction of 5 to 40 wt. %, in particular 10 to 25 wt. %, relative to the mass of the pulp.

The subject matter of the invention is further a support for recording layers comprising a raw base paper and at least one synthetic resin layer arranged on at least one side of the raw base paper, where the raw paper contains a hardwood pulp having a fibre fraction smaller than 200 μm after refining of at most 45 wt. % and an average fibre length of 0.4 to 0.8 mm and comprises a filler fraction of 5 to 40 wt. %, in particular 10 to 25 wt. %.

In a further embodiment of the invention, the object is achieved by a support material for recording layers comprising a raw base paper and at least one layer containing a binder, arranged on at least one side of the raw base paper, wherein the raw base paper contains a hardwood pulp having a fibre fraction smaller than 200 μm, after refining, of at most 45 wt. % and an average fibre length of 0.4 to 0.8 mm and comprises a filler fraction of 5 to 40 wt. %, in particular 10 to 25 wt. %.

Finally the object is achieved by a support material for recording layers comprising a raw base paper, at least one layer containing a binder, said layer being arranged on the front side of the raw base paper and a synthetic resin layer formed on said layer, and wherein the raw base paper contains a hardwood pulp having a fibre fraction smaller than 200 μm, after refining, of at most 45 wt. % and an average fibre length of 0.4 to 0.8 mm and comprises a filler fraction of 5 to 40 wt. %, in particular 10 to 25 wt. % relative to the mass of the pulp and the layer contains a hydrophilic film-forming binder.

For the purposes of the invention, the term raw base paper is understood as uncoated or surface-sized paper. In addition to pulp fibres, a raw base paper can contain sizing agents such as alkyl kentene dimers, fatty acids and/or fatty acid salts, epoxided fatty acid amides, alkenyl or alkyl succinic acid anhydride, wet strength agents such as polyamine polyamide epichlorohydrin, dry strength agents such as anionic, cationic or amphoteric polyamides, optical brighteners, pigments, dyes, defoamers and other known adjuvants in the paper industry. The raw base paper can be surface-sized. Suitable sizing agents for this purpose are, for example, polyvinyl alcohol or oxidised starch. The raw base paper can be produced on a Fourdrinier or a Yankee paper machine (cylinder paper machine). The basis weight of the raw base paper can be 50 to 250 g/m$^2$, in particular 80 to 180 g/m$^2$. The raw base paper can be used in uncompressed or compressed form (smoothed). Particularly well suited are raw base papers having a density of 0.8 to 1.05 g/cm$^3$, in particular 0.95 to 1.02 g/cm$^3$.

After refining the pulp has a fine fraction (less than 200 μm) of 0 to 35% by weight, preferably 10 to 35% by weight.

The pulp according to the invention has a fine material fraction (<100 μm) before refining of at most 15 wt. %, in particular 2 to 10 wt. %, relative to the mass of the pulp. The average fibre length of the unrefined pulp is 0.6 to 0.85 mm (Kajaani measurement). Furthermore, the pulp has a lignin content of less than 0.05 wt. %, in particular 0.01 to 0.03 wt. %, relative to the mass of the pulp.

The pulp according to the invention is preferably a eucalyptus pulp having a fibre fraction smaller than 200 μm after refining of 10 to 35 wt. % and an average fibre length of 0.5 to 0.75 mm. It has been shown that using a pulp having a limited fraction of fibres smaller than 200 μm reduces the loss of stiffness which occurs when using filler.

The hardwood pulp usually used, NBHK (Northern Bleached Hardwood Kraft Pulp) is distinguished by a fine material fraction at least 10 to 20 wt. % higher. For example, in the case of a maple pulp, the fibre fraction smaller than 200 μm after refining is about 60 wt. % relative to the mass of the pulp. The lignin content in this pulp is 0.18 wt. % relative to the mass of the pulp.

Kaolins, calcium carbonate in its natural form such as limestone, marble or dolomitic limestone, precipitated calcium carbonate, calcium sulphate, barium sulphate, titanium dioxide, talc, silica, aluminium oxide and mixtures thereof can be used as fillers in raw base paper. Particularly suitable is calcium carbonate having a grain size distribution in which at least 60% of the particles are smaller than 2 μm and at most 40% are smaller than 1 μm. In a particular embodiment of the invention, calcite is used, having a grain size distribution in which about 25% of the particles have a particle size of less than 1 μm and about 85% of the particles have a particle size of less than 2 μm.

According to a further embodiment of the invention calcium carbonate is used, having a grain size distribution in which at least 70%, in particular at least 80% of the particles have a particle size of less than 2 μm and at most 70% of the particles have a particle size of less than 1 μm.

The synthetic resin layer disposed on at least one side of the raw paper can preferably contain a thermoplastic polymer. Particularly suitable for this purpose are polyolefins, for example low-density polyethylene (LDPE), high-density polyethylene (HDPE), ethylene/α-olefin copolymers (LLDPE), polypropylene and mixtures thereof.

The synthetic resin layer can contain white pigments such as titanium dioxide as well as other adjuvants such as optical brighteners, dyes and dispersing agents.

The coating weight of the synthetic resin layer on the front side can be 5 to 50 g/m$^2$, in particular 10 to 30 g/m$^2$ or according to a further preferred embodiment, 10 to 20 g/m$^2$. The synthetic resin layer can be extruded as a single layer or co-extruded as multiple layers. The extrusion coating can be effected at machine speeds up to 600 m/min.

In a preferred embodiment of the invention, the back side of the raw base paper can be coated with a clear, i.e. pigment-free polyolefin, in particular polyethylene. The coating weight of the synthetic resin layer can be 5 to 50 g/m$^2$, in particular 10 to 40 g/m$^2$ or according to a further preferred embodiment 10 to 20 g/m$^2$.

The back side of the support material can also have other functional layers such as antistatic or anti-curl layers.

In a further embodiment of the invention, the synthetic resin layer can be a polymer film or biaxially oriented polymer film. Particularly well-suited are polyethylene or polypropylene films having a porous core layer and at least one unpigmented or white-pigmented pore-free surface layer arranged on at least one side of the core layer. The polymer film can be laminated onto the raw paper in an extrusion process where an adhesion promoter, for example, polyethylene can be used at the same time.

In another embodiment of the invention, a further layer containing a hydrophilic binder can be disposed between the raw base paper and the synthetic resin layer. Particularly suitable for this purpose are film-forming starches such as thermally modified starches, in particular maize starches or hydroxypropylated starches. In a preferred embodiment of the invention, low-viscosity starch solutions are used, wherein the Brookfield viscosities lie in a range of 50 to 600 mPas (25% solution at 50° C./100 rpm), in particular 100 to 400 mPas, preferably 200 to 300 mPas. The Brookfield viscosity is measured in accordance with ISO 2555. The binder preferably contains no synthetic latex. As a result of the lack of a synthetic binder, the material waste can be re-used without preliminary processing.

The layer containing a hydrophilic binder can preferably contain other polymers such as polyamide copolymers and/or polyvinylamine copolymers. The quantity of polymer used can be 0.4 to 5 wt. % relative to the mass of the pigment. According to a preferred embodiment, the quantity of this polymer is 0.5 to 1.5 wt. %.

The layer containing the hydrophilic binder can be arranged directly on the front side of the raw base paper or on the back side of the raw base paper. It can also be applied to the raw base paper as a single layer or as multiple layers. The coating mass can be applied inline or offline using all coating units conventionally used in paper manufacture, wherein the quantity being selected so that after drying the coating weight per layer is at most 20 g/m$^2$, in particular 8 t 17 g/m$^2$, or according to a preferred embodiment 2 to 6 g/m$^2$.

The layer can preferably contain a pigment. The pigment can be selected from a group of metal oxides, silicates, carbonates, sulphides and sulphates. Particularly well suited are pigments such as kaolins, talc, calcium carbonate and/or barium sulphate. Particularly preferred is a pigment having a narrow grain size distribution in which at least 70% of the pigment particles have a size of less than 1 μm. In order to achieve the effect according to the invention, the fraction of the pigment having a narrow grain size distribution in the total quantity of pigment should be at least 5 wt. %, in particular 10 to 90 wt. %. Particularly good results can be achieved with a fraction of 30 to 80 wt. % of the total pigment.

A pigment having a narrow grain size distribution is understood according to the invention as pigments having a grain size distribution in which at least about 70 wt. % of the pigment particles have a size of less than about 1 μm and in 40 to 80 wt. % of these pigment particles, the difference between the pigment having the largest grain size (diameter) and the pigment having the smallest grain size is less than about 0.4 μm. A calcium carbonate having a $d_{50\%}$ value of about 0.7 μm has proved to be particularly advantageous.

In a preferred embodiment of the invention, a pigment mixture consisting of the aforesaid calcium carbonate and kaolin was used. The calcium carbonate/kaolin quantitative ratio is preferably 30:70 to 70:30. It was surprisingly found that despite a high fraction of kaolin which has a tendency to yellowing, only an insignificant negative effect on the degree of whiteness of the coated material could be observed.

The binder/pigment quantitative ratio in the layer can be 0.1 to 2.5, preferably 0.2 to 1.5, but in particular about 0.9 to 1.3.

The solid material content of the coating mass according to the invention can be 15 to 35 wt. % relative to the weight of the coating mass.

It is assumed that these starches form a film on the surface of the raw base paper. This film prevents the pigment particles of the coating mass from sinking into the recesses of the paper surface. Binders and pigment thus remain on the surface of the raw base paper. Thus, less pigment is required to achieve a certain smoothness on the paper. This binder contributes to the fact that the pigmented papers can be recycled free from contamination using conventional repulping processes and can be reused in the cycle of the paper machine as unmixed paper wastage.

Depending on the desired use, further functional layers can be applied to the support material according to the invention such as silver salt emulsion layers for photographic recording materials, recording layers for an ink jet printing method or receiving layers for other image recording techniques such as thermal transfer methods (dye diffusion thermal transfer) or colour laser methods.

The following examples should explain the invention in more detail.

EXAMPLES

Manufacture of the Raw Base Papers

An eucalyptus pulp having a fibre fraction smaller than 200 μm (after refining, 35-38°SR) of 30 wt. % relative to the total pulp was used to manufacture the raw base papers. For the refining the pulp in the form of an approximately 5% aqueous suspension (high-consistency pulp) was ground to a freeness of 35 to 38°SR using a refiner. The concentration of pulp fibres in the low-consistency pulp was 1 wt. % relative to the pulp suspension. Additives such as a neutral sizing agent alkyl ketene dimer (AKD), wet strength agent polyamine polyamide epichlorohydrin resin (Kymene®) and a natural $CaCO_3$ (Hydrocarb® 60-BG) were added to the low-consistency pulp.

The low-consistency pulp, its pH-value set at around 7 to 7.8, is brought from the headbox to the wire of the paper machine, whereupon sheet forming takes place in the wire section of the paper machine accompanied by dewatering of the web. Further dewatering of the paper web to a water content of 58 to 72 wt. % relative to the web weight takes place in the press section. Further drying takes place in the dry section of the paper machine with heated drying cylinders. Further details are given in Table 1.

Production of the Coating Mass

The following coating masses specified in detail in Table 2 were applied to the raw paper having a basis weight of about 160 g/m$^2$ and a moisture of about 7%. Coating was carried out using a size press.

The following binders were used in the coating mass: Starch I: C-Film 05731 (Cerestar): hydroxypropylated maize starch/viscosity 600 mPas measured at 50° C./100 rpm/spindle 2 for a solution having a solid content of 25 wt. %.

Starch II: C-Film 07302 (Cerestar): thermally modified starch/viscosity 234 mPas measured at 50° C./100 rpm/spindle 2 for a solution having a solid content of 25 wt. %.

The pigments used in the coating mass are:

$CaCO_3$ with 85% pigment particles<1 μm (Covercarb® 85-ME, OMYA)

Kaolin with 65% pigment<1 μm (Lithoprint® EM, OMYA)

COMPARATIVE EXAMPLES

To produce the raw paper, instead of the eucalyptus pulp, a short-fibre sulphate pulp was used, comprising a mixture of various hardwood pulp types such as maple, birch, poplar and ash (NBHK). The fibre fraction smaller than 200 μm after refining is 60 wt. % relative to the mass of the pulp. The raw paper was produced with and without filler and also provided with a pigment coating.

Further details are given in Table 1.

The papers produced according to Examples B1 to B5 and Comparative Examples V1 to V3 were coated on the front side with a synthetic resin mixture comprising 71 wt. % of a low-density polyethylene (LDPE, 0.923 g/cm$^3$), 16 wt. % of a $TiO_2$ master batch (50 wt. % LDPE and 50 wt. % $TiO_2$) and 13 wt. % of other additives such as optical brighteners, Ca stearate and blue pigment with various coating weights (40 g/m$^2$, 30 g/m$^2$, 20 g/m$^2$). The back side of the papers was coated with a pigment-free synthetic resin mixture comprising 40 wt. % of a low-density polyethylene (LDPE, d=0.923 g/m$^2$) and 60 wt. % of a high-density polyethylene (HDPE, d=0.964 g/cm$^3$). Coating was carried out at extrusion speeds of 250 to 350 m/min.

Testing of the supports produced according to the examples and the comparative examples.

Stiffness

The stiffness values were determined using a SCAN-P 29.69 bending stiffness tester according to DIN 53121 with a strip width of 38 mm, a clamping length of 10 mm and a bending angle of 15°. The values are given in mN/10 mm.

Opacity

The measurements were made using a Zeiss Elrepho measuring device according to DIN 53146 using 80×80 mm samples. The evaluation is made in terms of $R_s/R_8$. 100%. $R_s$ is the sheet remission over black and $R_8$ is the stack remission.

Internal Bonding Strength

The measurements were made using an internal bonding strength tester Internal Bond Impact Tester according to TAPPI RC 308. The values are given in J/m$^2$.

Surface

The testing is used for objective assessment of paper surfaces using a digital image processing system and represents an internal testing means. Testing was carried out on approximately 20 cm wide strips over the roll width which were acclimatised for at least 30 minutes at 23° C. and 50% relative humidity. The evaluation is made on a scale of values from 100 (excellent) to 1500 (poor).

TABLE 1

| | | example | | | | | | | | |
|---|---|---|---|---|---|---|---|---|---|---|
| Property | Unit | B1 | B2 | B3 | B4 | B5 | V1 | V2 | V3 | V4 |
| Raw paper | | | | | | | | | | |
| Pulp | | Eucal | Eucal | Eucal | Eucal | Eucal | NBHK | NBHK | NBHK | NBHK |
| High-consistency material | | | | | | | | | | |
| Starch | Wt. % | 0.57 | 0.57 | 0.57 | 0.57 | 0.57 | 0.56 | 0.57 | 0.57 | 0.57 |

TABLE 1-continued

| | | example | | | | | | | | |
|---|---|---|---|---|---|---|---|---|---|---|
| Property | Unit | B1 | B2 | B3 | B4 | B5 | V1 | V2 | V3 | V4 |
| Low-consistency pulp | | | | | | | | | | |
| AKD | Wt. % | 0.48 | 0.24 | 0.40 | 0.24 | 0.24 | 0.24 | 0.48 | 0.48 | 0.48 |
| Kymene | Wt. % | 0.36 | 0.36 | 0.36 | 0.36 | 0.36 | 0.36 | 0.36 | 0.36 | 0.36 |
| Brightener | Wt. % | 0.06 | 0.06 | 0.06 | 0.06 | 0.06 | 0.06 | 0.06 | 0.06 | 0.06 |
| Filler | Wt. % | 10.00 | 10.00 | 13.50 | 15.70 | 19.00 | 15.00 | — | 15.00 | — |
| pH low-consistency pulp | | 7.5 | 7.6 | 7.6 | 7.8 | 7.7 | 7.7 | 7.0 | 7.7 | 7.0 |
| Freeness/High consistency pulp | ° SR | 36 | 37 | 38 | 37 | 35 | 33 | 33 | 33 | 33 |
| Fibre length | mm | 0.64 | 0.64 | 0.64 | 0.64 | 0.64 | 0.54 | 0.54 | 0.54 | 0.54 |
| Basis Weight | g/m$^2$ | 160 | 160 | 160 | 160 | 160 | 160 | 160 | 160 | 160 |
| Density | g/m$^2$ | 1.02 | 1.02 | 1.02 | 1.02 | 1.02 | 1.04 | 1.04 | 0.95 | 0.95 |

TABLE 2

| | | example | | | | | | | | |
|---|---|---|---|---|---|---|---|---|---|---|
| Property | | B1 | B2 | B3 | B4 | B5 | V1 | V2 | V3 | V4 |
| Binder: | | | | | | | | | | |
| Starch I | % | — | 90.5 | | | | — | — | | |
| Starch II | % | | | 90.5 | 47.0 | 47.0 | — | — | 47.0 | 47.0 |
| Pigment: | % | | | | | | | | | |
| $CaCO_3$ | % | | | | 26.4 | 26.4 | — | — | 26.4 | 26.4 |
| Kaolin | % | | | | 26.4 | 26.4 | — | — | 26.4 | 26.4 |
| Polymer additive: | | | | | | | | | | |
| Acroflex® VX 610 | % | — | 0.5 | 0.5 | 0.2 | 0.2 | — | — | 0.2 | 0.2 |
| Coating mass: | | | | | | | | | | |
| Solid content | % | | 22.0 | 21.0 | 21.0 | 21.0 | — | — | 21.0 | 21.5 |
| pH | | — | 8.0 | 8.0 | 8.0 | 8.1 | — | — | 8.1 | 8.0 |
| Viscosity | mPa | — | 50 | 50 | 50.0 | 50 | — | — | 50 | 50 |
| Coating weight | g/m$^2$ | — | 6.0 | 6.0 | 6.5 | 6.0 | — | — | 10 | 6.0 |

TABLE 3

| Test results | | | | | | | | | |
|---|---|---|---|---|---|---|---|---|---|
| | example | | | | | | | | |
| Property | B1 | B2 | B3 | B4 | B5 | V1 | V2 | V3 | V4 |
| Stiffness longitudinal | 232.7 | 253.17 | 242.20 | 235.9 | 190.78 | 215.2 | 262.14 | 222.30 | 282.64 |
| Stiffness transverse | 106.7 | 123.40 | 108.99 | 106.12 | 99.91 | 103.30 | 115.29 | 106.70 | 115.29 |
| Internal bonding strength | 170 | 182 | 175 | 165 | 155 | 160 | 243 | 168 | 261 |
| Opacity | 90.0 | 90.0 | 91.1 | 92.8 | 93.7 | 90.4 | 89.3 | 93.5 | 94 |
| Surface | 551 | 535 | 510 | 480 | 470 | 520 | 510 | 460 | 470 |

The invention claimed is:

1. A support material for recording layers comprising a raw base paper containing a hardwood pulp having a fiber fraction smaller than 200 μm after refining of 10 to 45 wt. % and an average fibre length of 0.4 to 0.8 mm and a filler fraction of 5 to 40 wt. % relative to the mass of the pulp, at least one synthetic resin layer located on at least one side of the raw paper, and at least one binder containing layer located on at least one side of the raw paper.

2. The support material according to claim 1, wherein the fiber fraction smaller than 200 μm after refining is 10 to 35 wt. %.

3. The support material according to claim 1, wherein the pulp is a eucalyptus pulp.

4. The support according to claim 3, wherein the eucalyptus pulp contains a fiber fraction smaller than 200 μm after refining of 10 to 35 wt. % relative to the mass of the pulp and has a fibre length of 0.5 to 0.75 mm.

5. The support material according to claim 1, wherein the raw base paper has a filler fraction of 10 to 25 wt. % based on the mass of the pulp.

6. The support material according to claim 5, wherein the filler is a calcium carbonate, titanium dioxide, talc and/or clay.

7. The support material according to claim 1, wherein the synthetic resin layer contains a thermoplastic polymer.

8. The support material according to claim 7, wherein the thermoplastic polymer is an LDPE, HDPE, LLDPE and/or polypropylene.

9. The support material according to claim 1, wherein the synthetic resin layer is a biaxially oriented polyolefin film.

10. The support material according to claim 1, wherein the coating weight of the synthetic resin layer on the front side is 5 to 50 g/m$^2$.

11. The support material according to claim 1, wherein the coating weight of the synthetic resin layer on the back side is 5 to 50 g/m$^2$.

12. The support material according to claim 1, wherein a layer containing a binder is disposed between the raw base paper and the synthetic resin layer.

13. The support material according to claim 12, wherein the binder is a hydrophilic film-forming polymer.

14. The support according material to claim 12, wherein the binder is a hydroxypropylated starch and/or thermally modified starch.

15. The support material according to claim 12, wherein the hydrophilic binder comprises a starch having a Brookfield viscosity of 50 to 600 mPas measured for a 25% solution at 50° C. and 100 rpm.

16. The support material according to claim 12, wherein the layer contains a pigment having a narrow grain size distribution in which at least 70% of the pigment particles have a diameter of less than 1 μm.

17. The support material according to claim 16, wherein the pigment is a calcium carbonate, kaolin, talc, titanium dioxide and/or barium sulphate.

18. The support material according to claim 16, wherein the binder/pigment quantitative ratio is 0.1 to 1.5.

19. The support material according to claim 12, wherein the coating weight of the binder containing layer is 2 to 20 g/m$^2$.

20. The support material according to claim 12, wherein the binder containing layer is arranged on the front side and/or back side of the raw base paper.

21. The support material according to claim 1, wherein the binder is a hydrophilic film-forming polymer.

22. The support according material to claim 1, wherein the binder is a hydroxypropylated starch and/or thermally modified starch.

23. The support material according to claim 1, wherein the hydrophilic binder comprises a starch having a Brookfield viscosity of 50 to 600 mPas measured for a 25% solution at 50° C. and 100 rpm.

24. The support material according to claim 1, wherein the layer contains a pigment having a narrow grain size distribution in which at least 70% of the pigment particles have a diameter of less than 1 μm.

25. The support material according to claim 24, wherein the binder/pigment quantitative ratio is 0.1 to 1.5.

* * * * *